E. ERICKSON.
CYCLE HANDLE BAR SHOCK ABSORBER.
APPLICATION FILED OCT. 11, 1912.
1,060,442.
Patented Apr. 29, 1913.
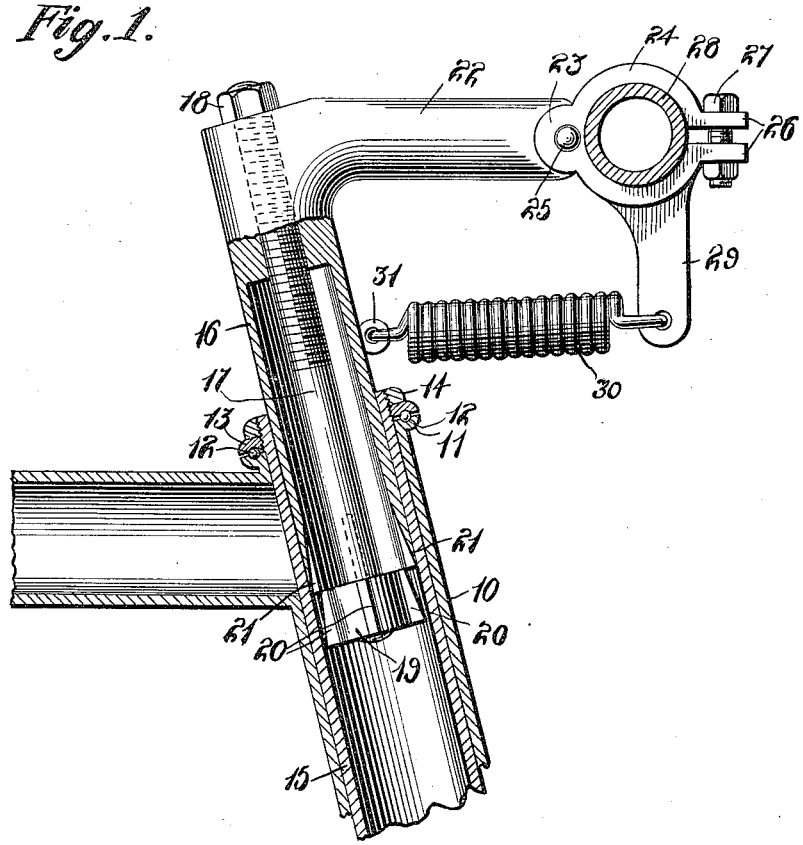
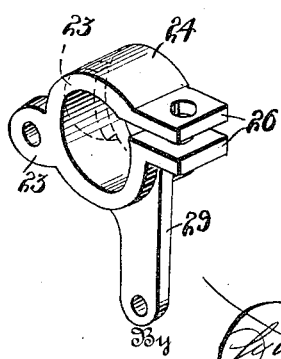
Witnesses
W. C. Fielding
Wm. S. Fowler
Inventor
E. Erickson,
By Chamalee Chamalee
Attorneys

UNITED STATES PATENT OFFICE.

EMIL ERICKSON, OF PHILLIPS, WISCONSIN.

CYCLE-HANDLE-BAR SHOCK-ABSORBER.

1,060,442.  Specification of Letters Patent.  Patented Apr. 29, 1913.

Application filed October 11, 1912. Serial No. 725,255.

*To all whom it may concern:*

Be it known that I, EMIL ERICKSON, a citizen of the United States, residing at Phillips, in the county of Price, State of Wisconsin, have invented certain new and useful Improvements in Cycle-Handle-Bar Shock-Absorbers; and I do hereby declare the following to be a full, clear, and exact description of the invention, such as will enable others skilled in the art to which it appertains to make and use the same.

This invention relates to bicycles and more particularly to shock absorbing handle bars for the same.

An object of the invention is to provide a handle bar constructed in such manner that the shocks incident to the front wheel striking an obstruction will be readily absorbed.

Another object is to generally improve and simplify the construction of devices of this character and increase the efficiency thereof.

With these and other objects in view, my invention will be more fully described and illustrated in the accompanying drawings attached to and forming a part of this application, in which, Figure 1 is an elevational view partly in section, of the forward portion of a bicycle frame showing my invention applied thereto. Fig. 2 is a detail view of the pivoted clamping bracket within which the handles are secured.

Referring more particularly to the accompanying drawings in which similar characters of reference designate corresponding parts throughout, 10 indicates the tubular head of the frame of a bicycle or similar vehicle, provided with the usual collar 11 to receive the bearing balls 12, over which the nut 13 is positioned, the usual upper nut 14 being positioned upon the nut 13 and said nuts 13 and 14 being engaged on the upper threaded end of the front fork stem 15.

Positioned within the upper portion of the stem 15 and adapted for vertical adjustment therein is the handle bar post 16 which is hollow and has positioned therein the threaded rod 17, the head 18 of which rests upon the upper end of the post 16 while the lower threaded end projects through the lower end of the said post and carries the expanding nut 19 having vertical ribs 20 thereon for engagement in the slits 21 in the lower end of the post, it being understood that the nut 20 and its ribs 19 are tapered for engagement in said lower end of the post upon rotation of the rod 17 in one direction, thus expanding the lower end of the post against the inner face of the stem 6 to lock the post 16 against independent movement.

The post 16 is provided with a forwardly directed arm 22 projecting from its upper end and the free extremity of said arm is pivoted between the ears 23 of the clamping bracket 24, by means of the pivot pin 25 passed through said ears 23 and the extremity of the arm 22. The pivoted clamping bracket 24 is preferably in the form of a split ring the ends of the ring being opposite the ears 23 and bent outwardly parallel to one another, as shown at 26 with the clamping bolt 27 positioned therethrough to draw the ends toward one another and thus clamp the handle bars 28 within the split ring. The tongue 29 projects downwardly from the lower half of the pivoted clamping bracket 24 and one end of a strong spiral spring 30 is secured in the free extremity of said tongue while the opposite end of the spring is secured in the lug 31 on the face of the post 16.

From the foregoing it will be clearly apparent that the post 16 may be readily adjusted vertically to raise or lower the handle bars and it will also be evident that all shocks will be readily absorbed by the spring 30, which controls the pivotal movement of the pivoted clamping bracket 24 within which the handles 28 are secured.

It will be apparent that I have provided a simple means for absorbing the shocks caused by the front wheel of the vehicle striking an obstruction and it will be evident that while I have shown the preferred form of my invention, minor changes may be made within the scope of the claims without departing from the spirit of my invention.

What is claimed is:

1. A handle bar post comprising a tubular portion, a forwardly directed arm projecting from the tubular portion, a pivoted clamping bracket carried by the arm, handles carried by said bracket, a tongue projecting from said bracket, and a spring secured by its opposite ends to the tongue and the tubular portion of the post.

2. The combination with the front fork stem of a cycle, of a handle bar post adjustably positioned in the stem, means for securing the post in adjusted position, an arm carried by the post, a split ring bracket pivoted to said arm, handles clamped in said bracket, a tongue projecting from said bracket, a lug carried by said post, and a shock absorbing spring secured to the tongue and the lug.

In testimony whereof, I affix my signature, in the presence of two witnesses.

EMIL ERICKSON.

Witnesses:
　ALBERT ROTH,
　F. E. MORNER.

Copies of this patent may be obtained for five cents each, by addressing the "Commissioner of Patents, Washington, D. C."